United States Patent [19]

Ossip et al.

[11] 3,938,591

[45] Feb. 17, 1976

[54] INTERMEDIATE FLUID SYSTEMS FOR LONG DISTANCE OIL DISPLACEMENT

[75] Inventors: Paul S. Ossip, Denver; Karl D. Dreher, Littleton, both of Colo.

[73] Assignee: Marathon Oil Company, Littleton, Colo.

[22] Filed: Mar. 7, 1975

[21] Appl. No.: 556,514

[52] U.S. Cl. ............... 166/275; 166/252; 166/274; 252/8.55 D
[51] Int. Cl.² .......................................... E21B 43/22
[58] Field of Search........ 166/273, 274, 275, 305 R, 166/252, 253; 252/8.55 D

[56] References Cited

UNITED STATES PATENTS

| | | | |
|---|---|---|---|
| 2,356,254 | 8/1944 | Lehmann et al. | 166/305 R |
| 3,163,214 | 12/1964 | Csaszar | 166/274 |
| 3,330,344 | 7/1967 | Reisberg | 166/274 |
| 3,373,809 | 3/1968 | Cooke, Jr. | 166/273 |
| 3,447,511 | 11/1969 | Tosch et al. | 166/275 X |
| 3,554,289 | 1/1971 | Webb | 166/305 R |
| 3,613,786 | 10/1971 | Jones et al. | 166/275 X |
| 3,740,343 | 6/1973 | Jones et al. | 166/275 X |
| 3,827,496 | 8/1974 | Schroeder | 166/274 X |

OTHER PUBLICATIONS

Dreher et al., *Journal of Petroleum Technology*, 12/71, "On Determining the Continuous Phase in Microemulsions," pp. 1437, 1438.

*Primary Examiner*—Stephen J. Novosad
*Assistant Examiner*—George A. Suckfield
*Attorney, Agent, or Firm*—Joseph C. Herring; Jack L. Hummel; Richard C. Willson, Jr.

[57] ABSTRACT

Micellar systems which are neither oil-external nor water-external can be formed from petroleum sulfonates, e.g., crude oil sulfonates formulated with water and, optionally, cosurfactants, e.g., hexanol. Because such micellar systems resist uptake of both oil and water, they are suitable for long distance displacement in which injection wells are spaced at least about 300 feet from production wells.

9 Claims, No Drawings

INTERMEDIATE FLUID SYSTEMS FOR LONG DISTANCE OIL DISPLACEMENT

BACKGROUND OF THE INVENTION

1. Field of the Invention

The present invention relates to the recovery of petroleum by injection of fluids to cause its displacement toward production wells.

2. Description of the Prior Art

The use of micellar systems for the displacement of oils is taught by a variety of United States patents, of which the following are exemplary.

Oil external miceller systems for oil recovery are mentioned in U.S. Pat. No. 3,261,399 to Coppel, U.S. Pat. No. 3,226,570 to Gogarty, U.S. Pat. No. 3,301,325 to Gogarty and Olsen, U.S. Pat. No. 3,476,184 to Davis and U.S. Pat. No. 3,497,008 to Jones and Roszelle. Water-external micellar systems are mentioned in U.S. Pat. No. 3,599,715 to Roszelle, U.S. Pat. No. 3,506,070 to Jones and U.S. Pat. No. 3,506,071 to Jones. Both water-external and oil-external micellar systems are mentioned in U.S. Pat. No. 3,254,714 to Gogarty and Olsen, U.S. Pat. No. 3,376,925 to Coppel, and U.S. Pat. No. 3,455,385 to Gogarty.

The literature contains many other patents and unpatented articles on this subject.

The test methods for differentiating oil-in-water and water-in-oil micellar systems have great importance in characterizing the various systems. The various tests include the dye solubility method, the phase dilution method, the conductivity method, the fluorescence method, the wetting of filter paper; all taught in more detail in Emulsions: Theory and Practice (Reinhold Publishing Corp., New York), particularly at pages 413–426 and in the references cited therein. The importance of a combination of miscibility data together with conductivity data is taught by a letter "On Determining the Continuous Phase in Microemulsions" by K. D. Dreher and R. D. Sydansk in the December, 1971, *Journal of Petroleum Technology*, pages 437 and 438. This letter also states that ". . . a system with the characteristics of a water-external micellar solutiion can exist in equilibrium with excess aqueous phase." and supports this with experimental evidence.

Later experimentation has led to the discovery that these anomalous or "intermediate micellar systems" which are substantially immiscible with either oil or water provide enhanced recovery of oil in the presence of water, either connate or remaining from previous water flooding. The increased oil recovery caused by the employment of intermediate micellar systems by the present invention has obvious economic advantages. The resistance of these systems to the uptake of both water and oil within the formation permits them to travel great distances through the formation while retaining efficiency as oil displacement fluids. This stability, then, permits wider spacing between injection and production wells with a consequent reduction in drilling costs required for secondary-type (including tertiary) recovery.

SUMMARY

General Statement of the Invention

According to the present invention, an intermediate micellar system is prepared, injected into an oil-bearing formation and used to displace oil through the formation toward a relatively remote production well, utilizing the general techniques of secondary-type recovery. The production well will preferably be located at least about 300 feet from the injection well, more preferably from about 500 to about 1500 feet distant.

As used herein, "intermediate micellar system" means a micellar system which is neither water-external or oil-external, external, comprising hydrocarbon and hydrocarbon sulfonate in water with or without a cosurfactant, said system having (a) a resistivity of more than about 25 and less than 1,000,000 ohm-centimeter (corresponding to a conductivity of less than 0.04 and more than $10^{-6}$ ohm$^{-1}$ cm$^{-1}$) and either (b) a droplet test result in which a droplet of the micellar system maintains its integrity for at least about one second when dropped into either water or oil, or (b') a dilution test in which the system is not miscible in all proportions both when diluted with water and when diluted with hydrocarbon. The lower limit of resistivity is not narrowly critical but in all intermediate micellar systems the resistivity will exceed that of the contained water plus the electrolytes. More preferred conductivity range of the micellar system is from about $10^{-5}$ to about $2 \times 10^{-2}$ ohm$^{-1}$ cm$^{116\ 1}$.

DESCRIPTION OF THE INVENTION

This invention is applicable to a secondary-type recovery process wherein a subterranean formation is flooded with a displacing fluid containing a semi-polar compound and/or an electrolyte. The displacing fluid can be any fluid which will effectively displace crude petroleum from the subterranean formation. Examples of such fluids include miscible-type fluids such as water-external and oil-external emulsions, and water-external and oil-external micellar dispersions. The term "micellar system" is meant to include "micellar solutions" and "micellar dispersions".

The intermediate micellar systems of the invention are composed essentially of a hydrocarbon, an aqueous medium, and a surfactant. Examples of hydrocarbon include crude oil, crude column overheads, straight-run gasoline and liquefied petroleum gases. Useful surfactants include cationic, nonionic and anionic surface active compounds. A particularly useful surfactant is an alkyl aryl sulfonate containing a monovalent cation (e.g., potassium, sodium, ammonium, and alkanol-substituted ammonium), more commonly known as petroleum sulfonates or as alkyl aryl naphthenic sulfonates. Examples of useful surfactants are disclosed in U.S. Pat. No. 3,275,075.

Semi-polar compounds, also known as co-surfactants and co-solubilizers, useful with the displacing fluids, especially the micellar dispersions, include alcohols, amines, ethers, esters, aldehydes, and ketones containing one up to about 20 or more carbon atoms. Preferably, the semi-polar compound is an alcohol, e.g., ethanol, isopropanol, n- and isobutanol, the amyl alcohols, ethoxylated alcohols, 1- and 2-hexanol, 1- and 2-octanol, the decyl alcohols, alkyl aryl alcohols such as p-nonyl phenol and alcoholic liquors such as fusel oil.

Preferably, the electrolytes are inorganic bases, inorganic acids and inorganic salts, e.g., ammonium hydroxide, ammonium sulfate, sodium hydroxide, sodium chloride, sodium sulfate, hydrochloric acid, and sulfuric acid. Other useful electrolytes can be found in U.S. Pat. No. 3,330,343. Also, the salts contained in brackish or brine water are to be included as water electrolytes.

Preferred micellar systems will comprise from about 2 to about 20 percent surfactant (more preferably from about 5 to about 15 percent surfactant); from about 30 to about 90 percent water (more preferably from about 50 to about 80 percent water); from about 2 to about 60 percent hydrocarbon (more preferably from about 5 to about 40 percent hydrocarbon); from 0 to about 10 weight percent cosurfactant (more preferably from about 0.1 to about 2 percent cosurfactant) and from about 0 to about 10 percent electrolyte (more preferably from about 1 to about 5 weight percent electrolyte).

Formation fluids tend to "leach" or "sorb" the surfactant, semi-polar compound and/or electrolyte from the displacing fluid. As a result, the operational characteristics of the displacing fluid in the formation are adversely affected. Substantial immiscibility reduces this loss.

PREFERRED EMBODIMENTS OF THE INVENTION

EXAMPLE I

Crude oil sulfonate is prepared by treatment of sweet Illinois crude oil with sulfur trioxide diluted with nitrogen in the presence of ethylene dichloride solvent at a temperature which ranges from about 10° to about 15°C and at atmospheric pressure. Crude reaction mixture is neutralized with ammonium hydroxide and the reaction solvent, ethylene dichloride, is removed by vacuum distillation and water is added to cause separation into two distinct liquid phases. The upper phase comprises principally unreacted hydrocarbons and is decanted off. The lower phase comprises petroleum sulfonates, water and electrolyte (largely ammonium sulfate) together with some unreacted hydrocarbon.

The lower, crude oil sulfonate phase is used to formulate a micellar system slug containing 3.5 weight percent $-SO_3NH_4$ groups, 60 percent $H_2O$ and 2.0 percent $(NH_4)_2SO_4$, the remainder comprising the hydrocarbon portion of the sulfonate molecule and sweet Illinois crude oil. Hexanol (1.25 lb/100 lb alcohol-free micellar system) is added to the above composition.

The above micellar system is shown to be intermediate by the droplet, dilution, and conductivity tests as described below:

Droplet Test

One drop of solution of the micellar system is dropped in a beaker containing distilled water and its behavior observed. A water-external solution will dissipate in the water in less than a second, an oil-external droplet will maintain its integrity for at least about a second. The droplet of the above micellar system maintains its integrity longer than one second, indicating that the micellar system is not water-external. The micellar system is therefore either oil-external or intermediate.

Dilution Test

A volume of the above micellar system is tested by placing in a transparent container, e.g., a graduated cylinder and adding approximately 10 percent by weight of either water or decane. The mixture is inverted once or twice to insure mixing and then allowed to stand. A water-external solution will be miscible with water but not with hydrocarbon as evidenced by the formation of a transparent hydrocarbon layer above the micellar system. An oil-external solution will be miscible with hydrocarbon but not with water, as evidenced by a transparent aqueous phase below the micellar system. The above micellar system on dilution with decane forms a hydrocarbon layer above the micellar system, indicating that the micellar system is not oil-external. Since the droplet test showed the micellar system was not water-external, the micellar system is intermediate.

Conductivity

In this test the resistivity of the micellar system to be tested is measured in a standard conductivity cell. A water-external micellar system will exhibit a resistivity (approximately that of the brine it contains) of less than about 25 ohm-cm, which corresponds to a conductivity of greater than about 0.04 $ohm^{-1}cm^{-1}$. An oil-external solution will exhibit a resistivity greater than about 1,000,000 ohm-cm, which corresponds to a conductivity of less than about $10^{-6}$ $ohm^{-1}cm^{-1}$. The above micellar system exhibits a conductivity of about 0.02 $ohm^{-1}cm^{-1}$, confirming that the micellar system is an "intermediate micellar system".

EXAMPLE II

The above micellar system is utilized to displace oil from a clean, fired Berea sandstone core 22 inches long by 3 inches in diameter. The core is subjected to a vacuum, saturated with connate water obtained from the Henry Lease in Illinois (hereinafter identified as Henry Plant Water and containing about 18,000 ppm of dissolved salts), flooded to irreducible water saturation with crude oil obtained from the Henry Lease in Illinois (a sweet black Illinois crude having a viscosity of about 7 cp at 22°C, hereinafter identified as Henry Crude Oil) and then flooded with Henry Plant Water to residual oil saturation.

The Berea core so prepared is flooded with 0.03 PV of a slug of the above intermediate micellar system driven through the core by subsequent injection of a solution of polyacrylamide mobility control agent dissolved in substantially fresh water. Frontal velocity is approximately 1.2 feet per day. Oil recovery is greater than 80 percent based on the volume of the residual oil.

EXAMPLE III

A crude oil sulfonate is prepared by treating an Illinois crude with sulfur trioxide, and neutralizing and stripping as in Example I. Water is added to the neutralized sulfonation reaction effluent to cause separation of a raffinate phase. After removal of the raffinate phase, p-nonyl phenol (PNP) is then added to effect separation of a brine phase containing water, ammonium sulfate, and some hydrophilic sulfonate material. The resulting petroleum sulfonate was used to formulate a slug containing 3.5 weight percent $SO_3NH_4$, 60 weight percent $H_2O$, 1.6 weight percent $(NH_4)_2SO_4$, and 2.3 weight percent PNP, the remainder comprising the hydrocarbon portion of the sulfonate molecules and crude which was added in Example I to achieve the above composition. Isopropanol (8.0 lb/100 lb of alcohol-free micellar system) is added.

This micellar system is indicated by the droplet test not to be water-external, is indicated by the dilution test to be neither water- nor oil-external, and the micellar system has a conductivity of 8.5 × $10^{-3} ohm^{-1}cm^{-1}$, all indicating that the micellar system was an "intermediate micellar system".

EXAMPLE IV

When the micellar system of Example III was tested for oil recovery according to Example II, the oil recovery was found to be greater than 80 percent.

EXAMPLE V

When a micellar system produced according to the technique of Example I and using the compositions of Example I and demonstrated by the above test to be an intermediate micellar system is injected into an injection well and driven through a subterranean oil-bearing formation by the use of thickened water drive fluid, it effectively displaces tertiary oil through the formation and through a producing well located greater than 300 feet away from the injection well.

MODIFICATIONS OF THE INVENTION

It should be understood that the claims appended hereto include those variations of the invention obvious to persons skilled in the art on reading of the present application.

We claim:

1. In a process for recovery of petroleum from formations by drilling into said formations at least one injection well and at least one production well spaced a distance from said injection well, and injecting fluids into said injection well to displace petroleum toward said production well and recovering petroleum from said production well, the improvement comprising injecting displacement fluids comprising intermediate micellar systems which substantially are immiscible with oil and water in the formation, said micellar systems having electrical conductivities in the range of from about $10^{-6}$ to about 0.04 $ohm^{-1}$ $centimeters^{-1}$, in an amount equivalent to from about 1 to about 25 percent of the pore volume of said formation.

2. A process according to claim 1 wherein said production well is placed from about 500 to about 1500 feet from said injection well.

3. A process according to claim 1 wherein said electrical conductivity of said micellar system is from about $10^{-5}$ to $2 \times 10^{-2}$ $ohm^{-1}$ $centimeters^{-1}$, and wherein micellar system comprises: from about 2 to about 20 weight percent surfactant, from about 30 to 90 weight percent water, from about 2 to 60 weight percent hydrocarbon, from 0 to 10 weight percent cosurfactant, and from about 0 to about 10 weight percent electrolyte.

4. A process according to claim 3 wherein said surfactant comprises petroleum sulfonate.

5. A process according to claim 4 wherein said petroleum sulfonate is manufactured by reacting sulfur trioxide with a whole crude oil or a topped crude oil.

6. A process according to claim 5 wherein said cosurfactant comprises an ethoxylated alcohol.

7. A process according to claim 5 wherein said cosurfactant comprises at least one of the cosurfactants selected from the groups consisting of: hexanol, isopropanol amyl alcohol, and p-nonylphenol.

8. A process according to claim 1 wherein said micellar system comprises from about 5 to about 15 percent surfactant, from about 50 to about 80 percent water, from about 5 to about 40 percent hydrocarbon, from about 0.1 to about 2 percent cosurfactant and from about 1 to about 5 percent electrolyte, all percents being by weight.

9. In a process according to claim 1 wherein said production well is at least 300 feet from said injection well.

* * * * *